Inventors.
Walter C. Ware
Charles J. Robertson

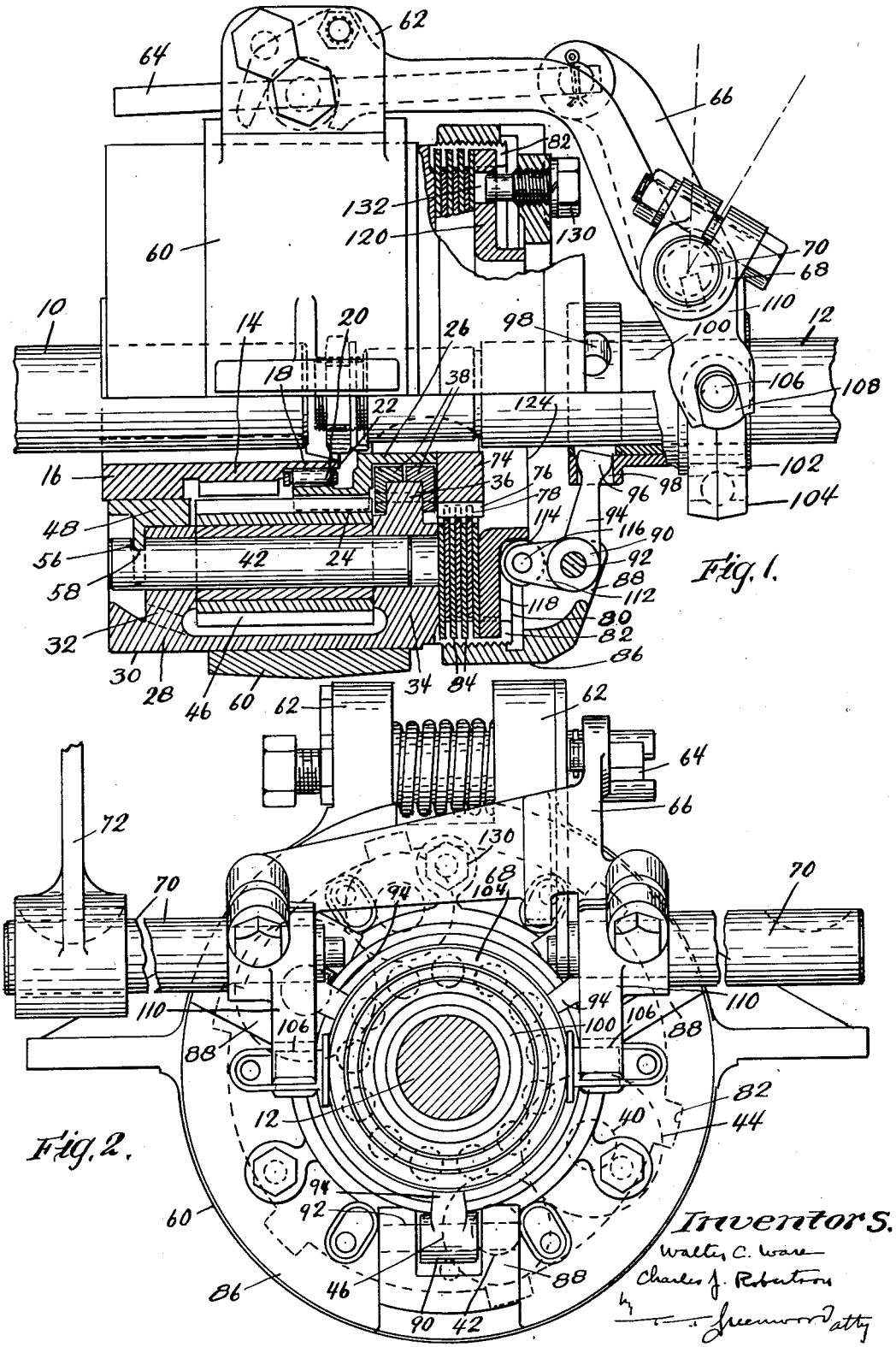

Patented Jan. 2, 1934

1,942,318

UNITED STATES PATENT OFFICE 1,942,318

REVERSING MECHANISM

Walter C. Ware and Charles J. Robertson, Taunton, Mass., assignors to Evans Stamping and Plating Company, Taunton, Mass., a corporation of Massachusetts Application December 14, 1931
Serial No. 580,852

12 Claims. (Cl. 74—34)

This invention relates to reversing mechanisms adapted, although not necessarily limited, to marine propulsion.

The particular type of reversing mechanism with which this invention has reference comprises planetary gearing for connecting a driving shaft, as as engine shaft with a driven shaft, as a propeller shaft, for the reverse drive of the propeller shaft. The reversing mechanism also includes clutch mechanism for connecting the two shafts for forward drive.

Reversing mechanisms are often required to be placed in locations of exceedingly restricted dimensions. The axial dimension especially is limited. Hence an object of the present invention is the provision of a reversing mechansm so constructed and arranged that its axial length is materially shorter than in previous reversing mechanisms.

A further object of the invention is the provision of a reversing mechanism of short axial length having an improved construction of bearing for the front end of the enclosing casing: an improved manner of holding the pinion gear pins in the casing; an improved manner of connecting the toggle link carrier for the clutch actuating mechanism with the enclosing casing; and an improved form of toggle and operating mechanism therefor; and an improved relation between the clutch mechanism and the reversing gearing elements, all of which cooperate in reducing the overall axial length of the reversing mechanism.

A further object of the invention is generally to improve the construction and operation of reversing mechanisms.

Fig. 1 is a side elevation, partly in longitudinal section, of a reversing mechanism embodying the present invention.

Fig. 2 is a rear end view of the mechanism of Fig. 1.

Figure 3:
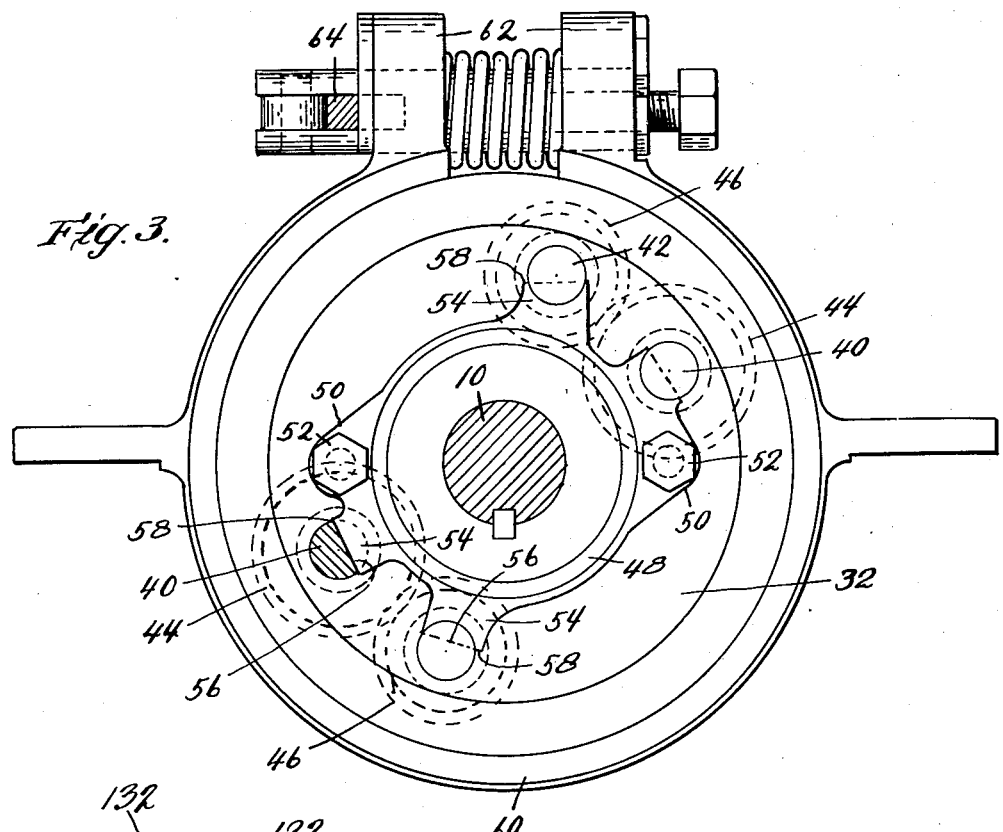
Fig. 3 is a front end view of the mechanism of Fig. 1, and illustrating more particularly the front bearing for the enclosing casing and the manner of locking the pinion carrying pins to the casing.
Figure 5:
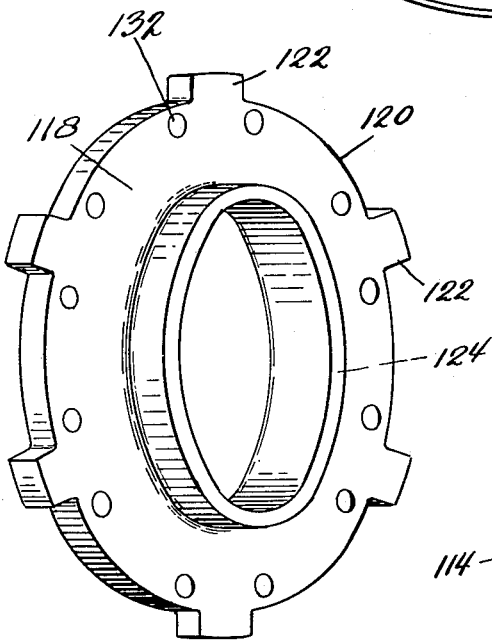
Fig. 5 is a perspective view of the clutch actuating plate.
Figure 4:
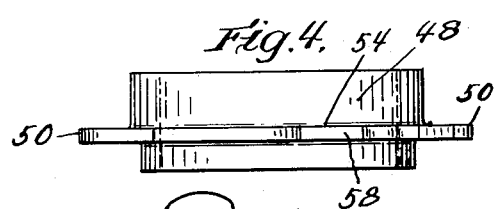
Fig. 4 is a plan view of the pinion lock of Fig. 3.
Figure 6:
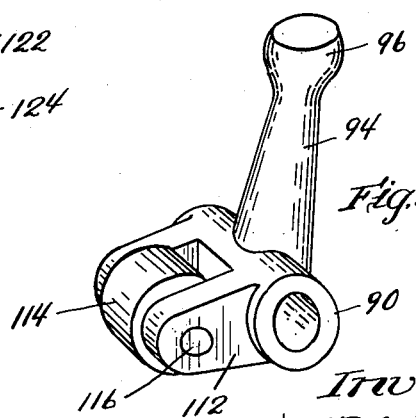
Fig. 6 is a perspective view of a clutch actuating bell crank lever.

The reversing mechanism here shown as embodying the present invention is adapted to connect the driving shaft 10, which may be an engine shaft, with the axially-aligned driven shaft 12, which may be a propeller shaft. A spur gear 14 is fixed to the driving shaft and has an enlarged cylindrical hub 16 at its outer end which constitutes the bearing support for the enclosing casing. The gear at its other end is provided with a reduced annular hub 18 which constitutes the inner race for a roller bearing 20. Said bearing is received within an internal annular recess 22 of a spur gear 24 so that said spur gears 14 and 24 are rotatably supported in axial alignment. Said spur gear 24 is provided with a hub 26 of reduced diameter which is fixed to the forward end of the driven shaft 12. An enclosing casing 28 surrounds said spur gears and has a cylindrical outer wall or drum 30, a front end wall 32, and a rear end wall 34. The rear end wall 34 has an inwardly directed radial flange 36 that surrounds the hub 26 of the driven spur gear 24 and carries bushings 38 which are complemental with each other and in which the hub 26 of the driven gear is journalled. The casing is provided with sets of pinion carrying pins 40 and 42, which pins are extended slidably into aligned passages in the end walls 32 and 34 of the casing. Said pins 40 carry large pinion gears 44 which are in mesh with the driving spur gear 14 and also with small pinion gears 46 which are carried by the pins 42 and which are in mesh with the driven spur gear 24. Thus when the casing is held stationary the driving shaft 10 through the meshing gears reversely rotates the driven shaft 12.

The front wall 32 of the casing 28 is rotatably supported on the hub 16 of the driving gear by a bearing sleeve 48 which is not necessarily longer than the axial dimension of the wall 32 and is removably received and seated in an axially disposed annular passage in said end wall and has radially outstanding ears 50 through which bolts 52 are passed and are screw-threaded into the end wall 32 whereby to secure the bearing sleeve removably in position. The bearing sleeve also constitutes means to hold the pinion pins removably connected with the enclosing casing. For this purpose the bearing sleeve is provided with outstanding lugs 54 which enter slots 56 in the outwardly projecting ends of the pins and have flat outer faces 58 which are seated on the flat bottom faces of the slots. Hence the pins are held both from rotation and from axial movement. The pins can be withdrawn from the casing by removing the bolts 50 and rotating the bearing plate a few degrees or until the lugs 54 are clear of the pins.

The casing 28 is held stationary to set the mechanism for reverse drive by means including a brake band 60 that encircles the casing and has confronting ends 62 located thereabove that are adapted to be drawn together to contract the band about and into frictional engagement with the casing. The band is contracted by mechanism that includes an axially movable cam bar 64 in a manner that is described in the copending application of Charles J. Robertson, Serial No. 574,251, filed November 11, 1931, and need not be further described here. The cam bar 64 is pivotally connected to the upper end of an actuating arm 66 of a yoke 68 which is fixed to aligned cross shafts 70 to one of which an operating lever 72 can be fixed. Rotary movement of the cross shaft in one direction from a neutral position conditions the mechanism for reverse drive and rotary movement of the shaft in the opposite direction conditions the mechanism for forward drive.

The clutch mechanism which connects the driving and driven shafts for forward drive includes a clutch plate carrier 74 comprising a hub which is keyed to the driven shaft 12 immediately at the rear of the rear casing wall 34. Said hub has peripheral splines 76 which engage a set of clutch plates 78. The casing 28 has a rearwardly-directed cylindrical extension 80 located at the rear end of the rear wall 34 and has axially extended slots 82 therein in which lugs of a second set of clutch plates 84 are located. Thus when the sets of clutch plates 78 and 84 are brought into frictional engagement the casing 28 is held from rotation with respect to the driven shaft and consequently is driven in a forward direction by the driving shaft through the locked planetary gears.

The clutch is set for forward drive by actuating mechanism that includes a ring 86 which surrounds the clutch plates and is provided with internal screw threads that mesh with external screw threads on the extension 80 outside of the clutch plates. The ring 86 is provided at the rear end thereof with sets of inwardly-directed spaced ears 88 to and between which bell crank levers 90 are pivoted on pins 92 carried by said ears. Said bell crank levers have inwardly-directed arms 94 that terminate in frustro-spherical inner ends or balls 96 which are received in radially-extended cylindrical passages 98 located at the forward end of an actuating sleeve 100 which is axially movable on the driven shaft. Said sleeve at its rear end is provided with the inner race 102 of a ball bearing, the outer race 104 of which has oppositely directed pins 106 that are located in slots 108 formed at the lower end of arms 110 of said yoke 68. Thus movements of said yoke serve to move the thrust sleeve 100 axially of the driven shaft. The bell crank levers also have forwardly-directed bifurcated arms 112 between which rollers 114 are located, which rollers are journalled on pins 116 carried by said forward arms. Said rollers are adapted to engage the radial face 118 of a clutch actuating plate 120. Said plate has splines 122 which are located in the slots 82 of the enclosing casing so that said plate is in driving connection with the casing. Said plate has a rearwardly-extended annular ledge 124 which surrounds the large central opening in the plate and is adapted to be abutted against by the rollers 114 thereby to limit the set position of said rollers. Thus as the thrust sleeve 100 is moved rearwardly the rollers 114 are caused to bear against and roll inwardly on the clutch actuating plate 120 whereby to force said plate forwardly and compress the clutch plates together and between it and the rear wall 34 of the enclosing casing whereby to set the mechanism for forward drive. The clutch actuating plate in combination with the roller carrying arms of the bell crank levers forms toggles by which a strong engaging pressure is applied to the plates. The ledge 124 of said plate is so located as to hold the bell cranks in a slightly over-shot position of the toggles so that they tend to remain in such position until positively moved therefrom in a clutch releasing direction. The carrying ring 86 for the bell crank levers is locked in any angularly adjusted position on the screw-threaded extension 80 of the enclosing casing by a bolt 130 which is screw-threaded in said plate and has its end removably received in any one of a series of apertures 132 formed in the clutch engaging plate.

The reversing mechanism thus described presents a substantial improvement in many respects over previous mechanisms. Whereas, heretofore, it was common to provide the forward wall 32 of the casing with a hub which was rotatably supported on the driving shaft, in the present construction the hub is eliminated and the bearing sleeve 48 takes its place, said bearing sleeve also holding the pinion supporting pins in the casing and thereby permitting the axial overall length of the casing wall and the parts associated therewith to be shorter than heretofore. The rear end wall 34 of the casing is located between the reversing gearing and the clutch mechanism so that the present mechanism is shortened by the length of the thrust pins that were heretofore necessary to transmit the clutch operating pressure to the clutch plates from the actuating mechanism located at the rear of said wall. The lever carrying ring 86 in the present construction surrounds the clutch plate and is screw-threaded to the the enclosing casing at the zone of the clutch plates thus reducing the axial length of the mechanism at least by the axial thickness of the clutch plates over the previous construction wherein the ring 86 was located entirely at the rear of the clutch plates. The construction of the bell crank levers and their association with the clutch actuating plate 120 of the present construction provides a considerably shorter axial length of actuating mechanism than has previously been the case. The spherical inner ends of the bell crank levers and their connections with the thrust sleeve 100 provides an improved connection between the levers and sleeve that, amongst other advantages, permits the radial arms of the lever to be longer than heretofore, and lessens the wear between the levers and sleeve.

We claim:

1. Reversing mechanism comprising the combination of driving and driven shafts, clutch mechanism for connecting said shafts for forward drive, and reversing gearing for connecting said shafts for reverse drive, said reversing gearing comprising a spur gear fixed to the driving shaft and having a hub, an enclosing casing carrying pinion gears some of which mesh with said spur gear, said casing having a forward inwardly directed apertured wall which surrounds said hub, supporting pins for said pinion gears located in said wall, and a bearing sleeve seated in the aperture of and bolted to said inwardly directed wall and having a rotatable support on said hub, said sleeve having means which is extended into the path of axial movement of and holds said pinion pins against axial displacement in said casing.

2. Reversing mechanism comprising the combination of driving and driven shafts, clutch mechanism for connecting said shafts for forward drive, reversing gearing for connecting said shafts for reverse drive, said reversing gearing including a spur gear fixed to said driving shaft and having a hub, a casing surrounding said spur gear and having a front wall which encircles said hub, pinion gears carried by said casing some of which mesh with said spur gear, pins carried by said casing wall on which said pinion gears are supported, a bearing sleeve received in and bolted to said front wall and having a rotatable support on said shaft, and means carried by said sleeve which is extended into the path of axial movement of said pins for securing said pins to said casing.

3. Reversing mechanism comprising the combination of driving and driven shafts, clutch mechanism for connecting said shafts for forward drive, reversing gearing for connecting said shafts for reverse drive, said reversing gearing including a spur gear fixed to said driving shaft and having a hub, a casing surrounding said spur gear and having a front wall which encircles said hub, pinion gears carried by said casing some of which mesh with said spur gear, pins carried by said casing on which said pinion gears are supported, a bearing sleeve received in and bolted to said front wall and having a rotatable support on said shaft, said pins having their forward ends extended forwardly of said front wall and having transverse slots in the extended ends, and said bearing sleeve having lugs which are seated in said slots and hold said pins against rotation and endwise movement.

4. Reversing mechanism comprising the combination of driving and driven shafts, clutch mechanism for connecting said shafts for forward drive, reversing gearing for connecting said shafts for reverse drive including a pinion carrier, gears fixed to said shafts, pinion gears carried by said carrier and which mesh with the aforesaid gears, pins carried by said carrier on which said pinion gears are rotatably supported, and a plate removably fixed to said carrier having lugs which enter transversely extended slots in said pins and hold said pins both against rotation and axial movement, said plate having recesses between said lugs and adapted to be rotated to rotate said lugs out of said slots in said pins and to position said recesses in register with said pins so that said plate and pins can be removed from said carrier.

5. Reversing mechanism comprising the combination of driving and driven shafts, reversing gearing for connecting said shafts for forward drive including a gear-carrying casing which has a rear end wall, clutch mechanism for connecting said shafts for forward drive including a cylindrical extension of said casing which is located in the rear of said wall and has external screw threads, clutch plates located within the zone bounded by said extension and said external screw threads and having a driving connection with said extension, cooperating clutch plates that have a driving connection with said driven shaft, a ring that surrounds said clutch plates and said cylindrical extension and is screw threaded adjustably on said extension having ears at the rear end thereof which are located in the rear of said clutch plates, and actuating arms pivoted to said ears for applying a clutch engaging pressure to said plates, wherein the driving connection between said first named set of clutch plates and said cylindrical extension comprises outstanding lugs which are located in notches in said extension, said notches being closed by said ring.

6. Reversing mechanism comprising the combination of driving and driven shafts, reversing gearing for connecting said shafts for reverse drive including a gear carrier having a rear end wall, clutch mechanism for connecting said shafts for forward drive comprising clutch plates located in the rear of said end wall, some of said plates having a driving connection with said carrier and others of said plates having a driving connection with said driven shaft, and actuating mechanism for said clutch mechanism including an actuating arm having a pivotal support at its rear end and a roller at its forward end which rides over the rear face of the rearmost clutch plate into a position wherein said arm is normal to said plate.

7. Reversing mechanism comprising the combination of driving and driven shafts, reversing gearing for connecting said shafts for reverse drive, including a gear carrier having a rear end wall, clutch mechanism for connecting said shafts for forward drive comprising clutch plates located in the rear of said end wall, some of said plates having a driving connection with said carrier and others of said plates having a driving connection with said driven shaft, and actuating mechanism for said clutch mechanism including an actuating arm having a pivotal support at its rear end and a roller at its forward end which rides over the rear face of the rearmost clutch plate into a position wherein said arm is normal to said plate, and means carried by said rearmost plate for holding said arm against movement in one direction beyond said normal position.

8. Reversing mechanism comprising the combination of driving and driven shafts, reversing gearing connecting said shafts for reverse drive including a gear carrier having a rear end wall, clutch mechanism for connecting said shafts for forward drive including clutch plates located at the rear of said wall, some of said clutch plates having driving engagement with said carrier and other clutch plates having a driving engagement with said driven shaft, the rearmost clutch plate having a rearwardly directed flange, actuating mechanism for said clutch mechanism including a series of strut arms having pivotal supports for their rear ends and having their front ends disposed outwardly of said flange and movable over the rear face of said rearmost clutch plate and in pressure-applying engagement therewith into a position wherein they are normal to said clutch plate and are against said flange.

9. Reversing mechanism comprising the combination of driving and driven shafts, gearing connecting said shafts for reverse drive including a gear carrier having a rear end wall, clutch plates located at the rear of said wall, some of said clutch plates having a driving connection with said carrier and other plates having a driving connection with said driven shaft, and actuating mechanism for said clutch mechanism comprising a ring carried by said gear carrier, bell cranks carried by said ring in the rear of said clutch plates having forwardly extended arms which are movable over the rear face of the rearmost clutch plate in engagement therewith into a clutch-set position wherein said arms are normal to said clutch plate.

10. Reversing mechanism comprising the combination of driving and driven shafts, gearing connecting said shafts for reverse drive, and clutch mechanism connecting said shafts for forward drive including cooperating clutch plates, and actuating mechanism for said clutch plates comprising a sleeve which is slidable on said driven shaft and has a cylindrical passage extended inwardly thereof from its periphery, and a pivotally supported clutch actuating arm extended inwardly toward said sleeve and having a spherically-shaped inner end which is received loosely in said cylindrical passage for actuation by said sleeve.

11. Reversing mechanism comprising the combination of driving and driven shafts, gearing connecting said shafts for reverse drive, clutch mechanism connecting said shafts for forward drive including cooperating clutch plates, and actuating mechanism for said clutch plates including a sleeve which is movable axially of said driven shaft and has cylindrical recesses which are directed inwardly from the periphery thereof, and pivotally-supported bell crank levers actuated by said sleeve having arms which apply clutching pressure to said clutch plates and have other and inwardly directed spherically-terminated arms that are loosely received in said cylindrical recesses.

12. Reversing mechanism comprising the combination of driving and driven shafts, gearing connecting said shafts for reverse drive including a gear carrier having a rearwardly-directed cylindrical extension, clutch plates located within said extension, some of said plates having a driving connection with said extension and other plates having a driving connection with said driven shaft, and clutch actuating mechanism including a ring which surrounds said clutch plates and is screw-threaded adjustably on said extension, a sleeve which is movable axially of said driven shaft, and bell crank levers pivotally carried by said ring having forwardly-directed arms which apply clutch-engaging pressure to said clutch plates and inwardly-directed arms terminated in balls which are loosely received in cylindrical recesses of said sleeve.

WALTER C. WARE.
CHARLES J. ROBERTSON.